(12) United States Patent
Noda et al.

(10) Patent No.: US 12,253,838 B2
(45) Date of Patent: Mar. 18, 2025

(54) INFORMATION PROCESSING DEVICE, RECORDING MEDIUM, AND PROCESS CONDITION SEARCH METHOD

(71) Applicant: Tokyo Electron Limited, Tokyo (JP)

(72) Inventors: Yuto Noda, Nirasaki (JP); Shota Yamazaki, Nirasaki (JP); Yuichi Takenaga, Nirasaki (JP); Toshiyuki Fukumoto, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 488 days.

(21) Appl. No.: 17/584,712

(22) Filed: Jan. 26, 2022

(65) Prior Publication Data

US 2022/0244685 A1  Aug. 4, 2022

(30) Foreign Application Priority Data

Feb. 4, 2021 (JP) ................ 2021-016352

(51) Int. Cl.
  *G05B 13/04* (2006.01)
  *G05B 13/02* (2006.01)
  *G05B 23/02* (2006.01)

(52) U.S. Cl.
  CPC ....... *G05B 13/042* (2013.01); *G05B 13/0265* (2013.01); *G05B 23/0235* (2013.01); *G05B 23/0262* (2013.01)

(58) Field of Classification Search
  CPC .............. G05B 13/042; G05B 13/0265; G05B 23/0235; G05B 23/0262; G05B 19/41885; G06N 20/00; H01L 21/67253; H01L 21/0223; G06F 30/27; G06F 2111/06; G06F 2119/02; G06T 2207/20084; G06T 2207/30148
  See application file for complete search history.

(56) References Cited

U.S. PATENT DOCUMENTS

2019/0325108 A1* 10/2019 Turek .................... G06N 3/08
2019/0369605 A1* 12/2019 Nakada ............ G05B 19/41865
(Continued)

FOREIGN PATENT DOCUMENTS

JP       2007-227618 A    9/2007
WO    2016132759 A1    8/2016

*Primary Examiner* — Kamini S Shah
*Assistant Examiner* — Jonathan Michael Skrzycki
(74) *Attorney, Agent, or Firm* — Armstrong Teasdale LLP

(57) ABSTRACT

An information processing device includes: a machine learning model selection part configured to select a machine learning model appropriate for a data set used for learning of the machine learning model; a calculation part configured to perform an optimization calculation by using the selected machine learning model to calculate process conditions that can achieve a target process result, predicted values of a process result corresponding to each of the process conditions, and reliability of the predicted values; a process condition selection part configured to select, among the process conditions that can achieve the target process result, one or more process conditions according to the predicted values of the process result and the reliability of the predicted values; and a display controller configured to display the selected process conditions, the predicted values of the process result corresponding to each of the selected process conditions, and the reliability of the predicted values.

7 Claims, 6 Drawing Sheets

(56) References Cited

U.S. PATENT DOCUMENTS

2020/0050329 A1* 2/2020 Maclean .............. G06N 20/00
2021/0263922 A1* 8/2021 Okuyama ........... G06F 16/2462
2022/0207351 A1* 6/2022 Sarkar .................. G06N 3/042
2022/0414555 A1* 12/2022 Miyamoto ............ G06Q 10/04

* cited by examiner

INFORMATION PROCESSING DEVICE, RECORDING MEDIUM, AND PROCESS CONDITION SEARCH METHOD

CROSS-REFERENCE TO RELATED APPLICATION

This application is based upon and claims the benefit of priority from Japanese Patent Application No. 2021-016352, filed on Feb. 4, 2021, the entire contents of which are incorporated herein by reference.

TECHNICAL FIELD

The present disclosure relates to an information processing device, a recording medium, and a process condition search method.

BACKGROUND

In the related art, there has been known a technique for estimating physical quantities while changing parameters, when repeatedly executing a simulation of, for example, an etching process (see, for example, Patent Document 1).

PRIOR ART DOCUMENT

Patent Document

Patent Document 1: International Publication No. WO 2016/132759

SUMMARY

According to an aspect of the present disclosure, there is provided an information processing device, which creates a machine learning model of a semiconductor manufacturing device executing a process according to a process condition and searches for a process condition that can achieve a target process result by using the machine learning model. The information processing device includes: a machine learning model selection part configured to select, among a plurality of machine learning models created by using a plurality of regression methods, a machine learning model appropriate for a data set used for learning of the machine learning model; a calculation part configured to perform an optimization calculation by using the selected machine learning model to calculate a plurality of process conditions that can achieve the target process result, predicted values of a process result corresponding to each of the plurality of process conditions, and reliability of the predicted values; a process condition selection part configured to select, among the plurality of the process conditions that can achieve the target process result, one or more process conditions according to the predicted values of the process result and the reliability of the predicted values; and a display controller configured to display the selected process conditions, the predicted values of the process result corresponding to each of the selected process conditions, and the reliability of the predicted values.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

System Configuration

Figure 1:
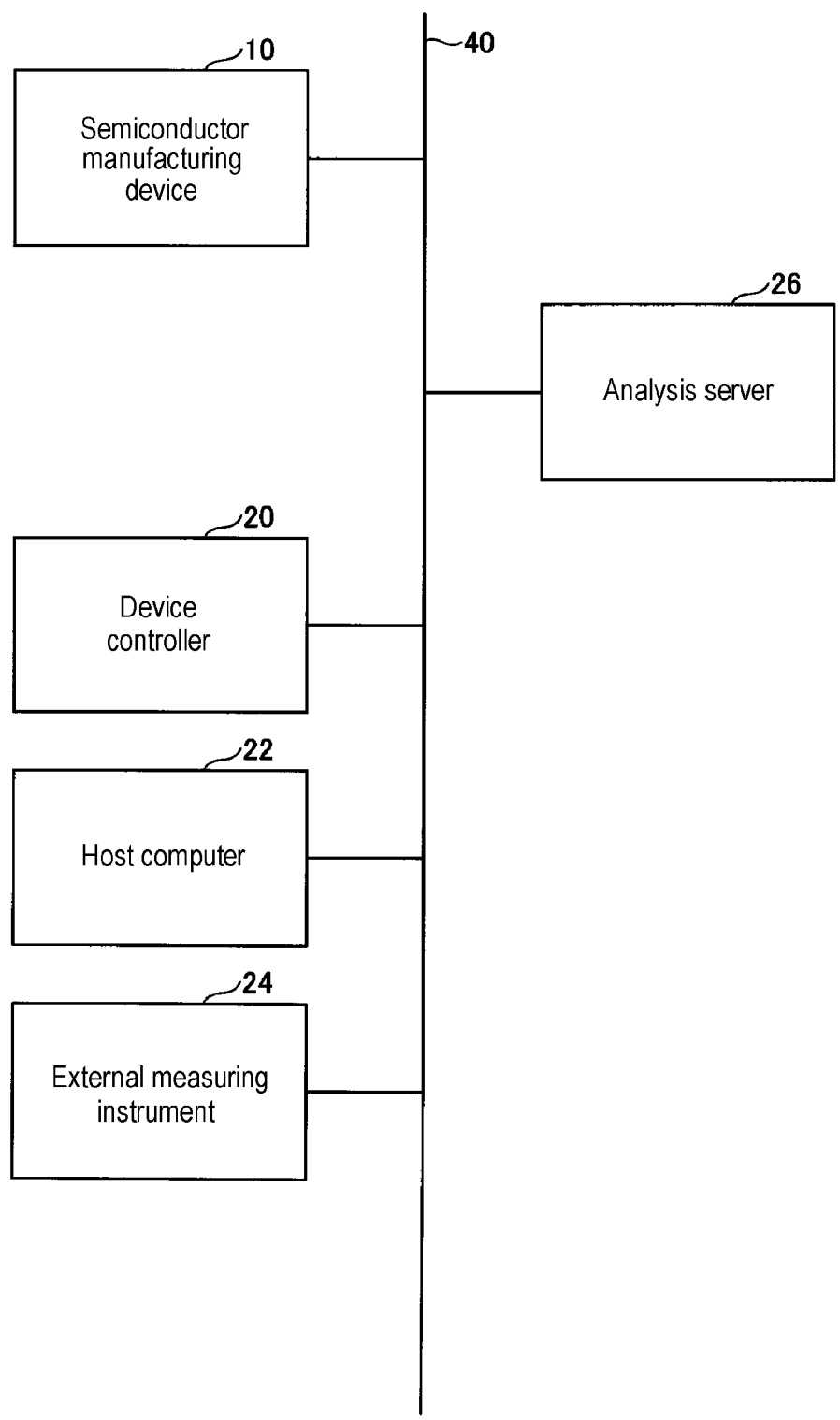
FIG. 1 is a configuration diagram of an example of an information processing system according to an embodiment.

FIG. 1 is a configuration diagram of an example of an information processing system according to an embodiment of the present embodiment. An information processing system 1 illustrated in FIG. 1 includes a semiconductor manufacturing device 10, a device controller 20, a host computer 22, an external measuring instrument 24, and an analysis server 26.

The semiconductor manufacturing device 10, the device controller 20, the host computer 22, the external measuring instrument 24, and the analysis server 26 are communicably connected to one another via a network 40 such as a local area network (LAN).

The semiconductor manufacturing device 10 is, for example, a heat treatment device for film formation, and executes a process according to each step of a semiconductor manufacturing process (e.g., film formation, etching, ashing, cleaning, or the like) according to a control command (process condition) output from the device controller 20. The process condition is a condition of the semiconductor manufacturing process and is a combination of parameters for controlling (adjusting) control components (control knobs) of the semiconductor manufacturing device 10. There are a wide variety of parameter combinations for adjusting the control knobs.

The device controller 20 is a controller having a computer configuration for controlling the semiconductor manufacturing device 10. The device controller 20 outputs a process condition, which is calculated and selected as will be described later, to the semiconductor manufacturing device 10 as parameters for adjusting the control knobs of the semiconductor manufacturing device 10.

The host computer 22 is an example of a man-machine interface (MMI) that receives an instruction for the semiconductor manufacturing device 10 from an operator and provides information about the semiconductor manufacturing device 10 to the operator by displaying the information or the like.

The external measuring instrument 24 is a measuring instrument, for example, a film thickness measuring instrument, a sheet resistance measuring instrument, or a particle measuring instrument, that measures a result (a process result) after the execution of the process according to the process condition. The external measuring instrument 24 measures an actually measured value of an indicator for determining success or failure of the process result. There are a wide variety of indicators for determining success or failure of the process result. For example, the external measuring instrument 24 measures a film formation state (a film formation result) on a wafer, such as a monitor wafer, as an example of the actually measured value of the process result.

As will be described later, the analysis server 26 creates a plurality of machine learning models by using a plurality of regression methods, and calculates a process condition that can achieve a target process result by using the created machine learning models. In addition, as will be described later, the analysis server 26 selects, from a plurality of process conditions that can achieve the target process result, a process condition to be proposed to an operator or the like according to predicted values of a process result corresponding to each process condition, reliability of the predicted values, or the like.

The operator causes the semiconductor manufacturing device 10 to execute a process according to the process condition selected by the analysis server 26. After executing the process according to the process condition, the operator measures an actually measured value of the process result by the external measuring instrument 24. The process condition and the process result (the process result corresponding to the process condition) when the semiconductor manufacturing device 10 is caused to execute the process according to the process condition are fed back to the analysis server 26, whereby accuracy of process conditions which will be calculated from a next time onward is improved.

When the actually measured value of the process result reaches a target value of the process result, the operator terminates searching for a process condition that can achieve the target process result. When the actually measured value does not reach the target value of the process result, the operator continues searching for a process condition that can achieve the target process result.

The information processing system 1 in FIG. 1 is an exemplary embodiment, and there are various system configuration examples depending on an application or purpose. The classification of devices illustrated in FIG. 1, that is, the semiconductor manufacturing device 10, the device controller 20, the host computer 22, the external measuring instrument 24, and the analysis server 26, is an example.

For example, the information processing system 1 may have various configurations, such as a configuration in which two or more of the semiconductor manufacturing device 10, the device controller 20, the host computer 22, the external measuring instrument 24, and the analysis server 26 are integrated or a configuration in which the devices are further divided.

Hardware Configuration

Figure 2:
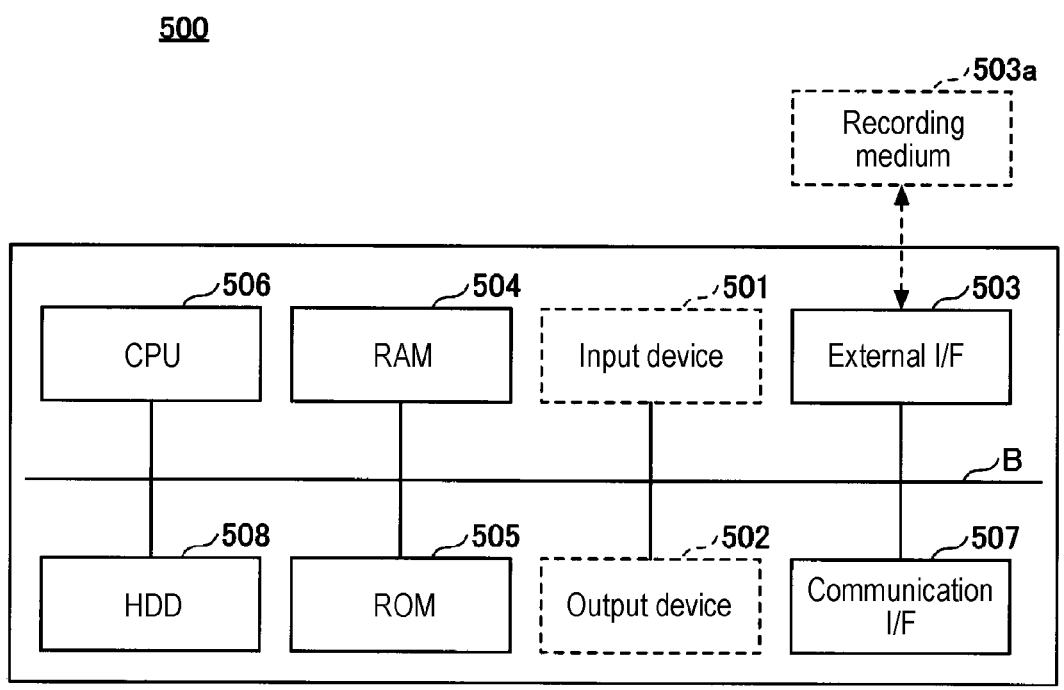
FIG. 2 is a hardware configuration diagram of an example of a computer.

The device controller 20, the host computer 22, and the analysis server 26 of the information processing system 1 are implemented by, for example, a computer having a hardware configuration illustrated in FIG. 2. FIG. 2 is a hardware configuration diagram of an example of a computer.

A computer 500 of FIG. 2 includes an input device 501, an output device 502, an external interface (I/F) 503, a random access memory (RAM) 504, a read only memory (ROM) 505, a central processing unit (CPU) 506, and a communication I/F 507, a hard disk drive (HDD) 508, and the like, which are connected to one another by a bus B. The input device 501 and the output device 502 may be connected and used when necessary.

The input device 501 is a keyboard, mouse, touch panel, or the like and is used by the operator or the like to input respective operation signals. The output device 502 is a display or the like and displays a process result by the computer 500. The communication I/F 507 is an interface for connecting the computer 500 to the network 40. The HDD 508 is an example of a nonvolatile storage device that stores a program or data.

The external I/F 503 is an interface with external devices. The computer 500 can read and/or write data from and/or into a recording medium 503a, such as a secure digital (SD) memory card, via the external I/F 503. The ROM 505 is an example of a nonvolatile semiconductor memory (a storage device) in which a program or data is stored. The RAM 504 is an example of a volatile semiconductor memory (a storage device) which temporarily holds a program or data.

The CPU 506 is an arithmetic operation device that controls the entirety of the computer 500 or implements functions of the computer 500 by reading a program or data from a storage device such as a ROM 505 or an HDD 508 onto the RAM 504 and executing a process.

The device controller 20, the host computer 22, and the analysis server 26 illustrated in FIG. 1 can implement various functions to be described later by executing a program in the computer 500 having, for example, the hardware configuration illustrated in FIG. 2.

Functional Configuration

Figure 3:
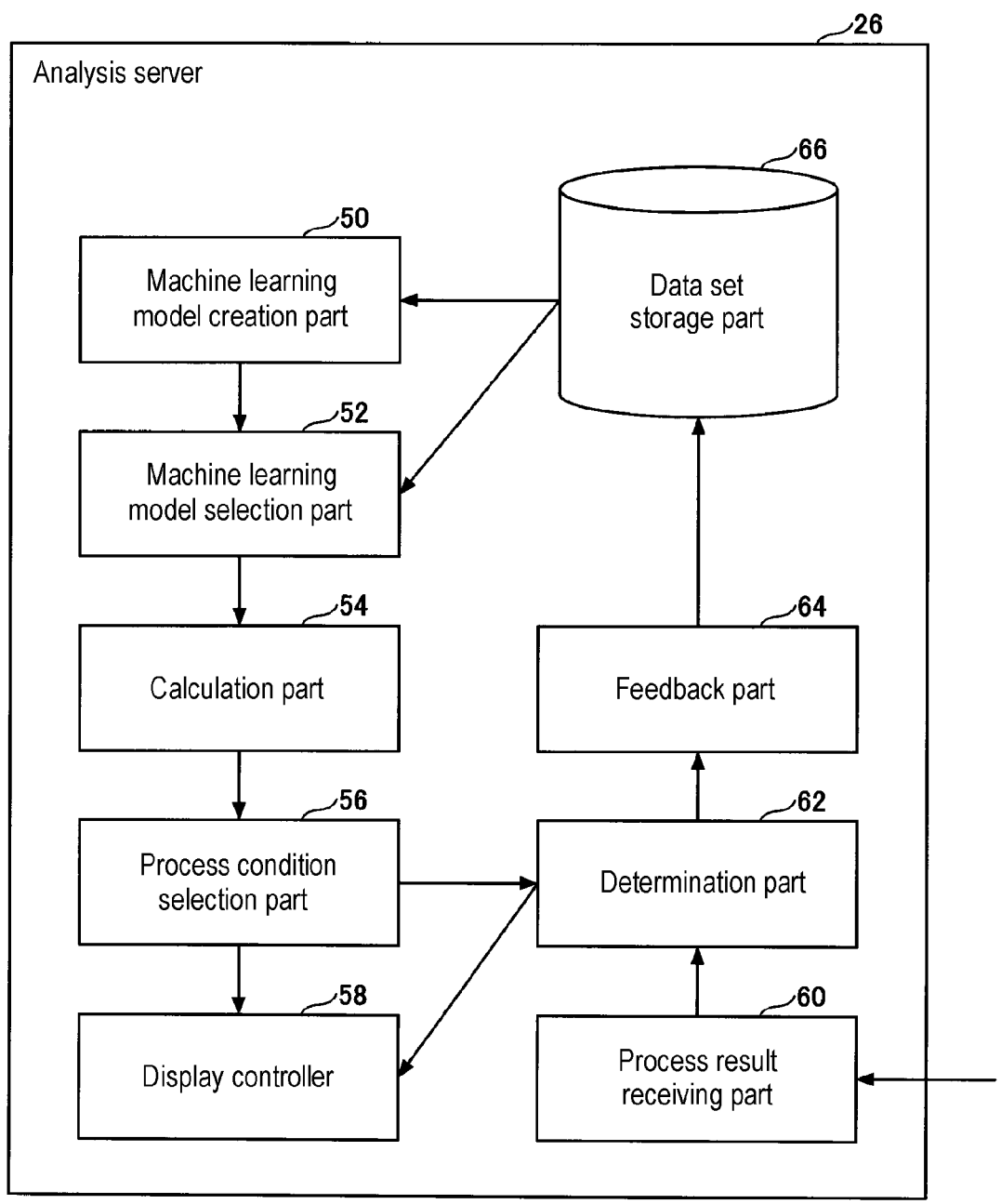
FIG. 3 is a functional block diagram of an example of an analysis server according to an embodiment.

The analysis server 26 of the information processing system 1 according to the present embodiment is implemented by, for example, functional blocks illustrated in FIG. 3. FIG. 3 is a functional block diagram of an example of an analysis server according to the present embodiment. In the functional block diagram of FIG. 3, illustration of configurations unnecessary for explaining the present embodiment is omitted.

By executing a program for the analysis server 26, the analysis server 26 implements a machine learning model creation part 50, a machine learning model selection part 52, a calculation part 54, a process condition selection part 56, a display controller 58, a process result receiving part 60, a determination part 62, a feedback part 64, and a data set storage part 66.

The data set storage part 66 stores a data set used by the machine learning model creation part 50 and the machine learning model selection part 52. The data set stored in the data set storage part 66 associates a combination of parameters (process condition) for adjusting the control knobs with an actually measured value of a process result corresponding to the process condition. For example, the data set stored in the data set storage part 66 is prepared by causing the semiconductor manufacturing device 10 to execute a process under a plurality of process conditions and collecting actually measured value of process results as data when the process is executed under the respective process conditions.

The data set stored in the data set storage part 66 includes data for learning used by the machine learning model creation part 50 and data for evaluation used by the machine learning model selection part 52. For example, in a statistical method of evaluating generalization performance called cross-validation, data is divided into k pieces to use one piece as data for evaluation and the remaining k-1 pieces as data for learning.

The machine learning model creation part 50 creates a plurality of machine learning models of regression methods such as linear regression and non-linear regression by using the data for learning in the data set stored in the data set storage part 66.

The machine learning model selection part 52 selects, among the machine learning models created by the machine learning model creation part 50, one or more machine learning models appropriate for the prepared data set by using the data for evaluation in the data set stored in the data set storage part 66.

The calculation part 54 acquires, for example, a target process result set by the operator. The calculation part 54 may acquire a target process result stored in the data set storage part 66 or the like, or may acquire a target process result input by the operator on an input screen or the like.

The calculation part 54 performs multi-objective optimization calculation by using the one or more machine learning models selected by the machine learning model selection part 52 to calculate a plurality of process conditions that achieve the target process result. Since a plurality of indicators of the target process result exists, the calculation part 54 performs multi-objective optimization to calculate a plurality of process conditions each of which achieves a process result satisfying all the indicators of the target process result, or a plurality of process conditions each of which achieves a process result close to the target process result.

In addition, some machine learning models may calculate reliability of the predicted values. Therefore, the calculation part 54 calculates a process condition, predicted values of a process result corresponding to the calculated process condition, and reliability of the predicted values. Reliability of predicted values of a machine learning model that cannot calculate the reliability of the predicted values is calculated by using another machine learning model that can calculate reliability of predicted values. The reliability of the predicted values serves as one of factors used for determining under which process condition the semiconductor manufacturing device executes a process, in other words, one of the factors used for selecting a process condition by a program.

The process condition selection part 56 selects one or more process conditions from the plurality of process conditions calculated by the calculation part 54. For example, the process condition selection part 56 refers to predicted values of a process result of each process condition calculated by the calculation part 54 and reliability of the predicted values, and selects one or more process conditions having good predicted process performance and high reliability. The predicted process performance may be determined based on achievement levels of the predicted values with respect to the target values of the process result. The reliability of the process condition may be determined based on the reliability of the predicted values of the process result.

The display controller 58 displays, on an output screen or the like, the one or more process conditions selected by the process condition selection part 56, the achievement levels of the predicted values with respect to the target values of the process result corresponding to each process condition, and the reliability of the predicted values. Therefore, the operator may recognize one or more process conditions which are predicted, by the machine learning models, to achieve a target process result. In addition, the display controller 58 performs displaying an input screen or the like via which a target process result input from the operator is received, and displaying a result of determining whether to continue or terminate the process condition search, which will be described later, or the like.

Thereafter, the operator causes the semiconductor manufacturing device 10 to execute a process according to each of the one or more process conditions selected by the process condition selection part 56. In addition, the operator measures, by the external measuring instrument 24, actually measured values of the process result after the process according to each process condition is executed. The operator provides the analysis server 26 with the actually measured values of the process result measured by using the external measuring instrument 24. The actually measured values of the process result may be provided to the analysis server 26 from the external measuring instrument 24 via the network 40, or may be provided via a recording medium such as a universal serial bus (USB) memory.

The process result receiving part 60 receives the actually measured values of the process result corresponding to each of the one or more process conditions. The determination part 62 compares the target values of the process result of each of the one or more process conditions selected by the process condition selection part 56 with the actually measured values of the process result received by the process result receiving part 60, and determines whether to continue or terminate the process condition search based on achievement levels of the actually measured values with respect to the target values of the process result. The determination part 62 causes, for example, the display controller 58 to display the result of determining whether to continue or terminate the process condition search.

The feedback part 64 adds the one or more process conditions and the actually measured values of the process result corresponding to each process condition to the data set stored in the data set storage part 66, thereby feeding back the process result. Since the analysis server 26 according to the present embodiment feeds back the actually measured values of the process result corresponding to each process condition as described above, the learning function operates, and the calculation accuracy from a next time onward is improved.

Process

In the following, a description will be made on an example in which an operator searches for a process condition that can achieve a target film formation result by using machine learning models. The film formation result is an example of a process result.

Figure 4:
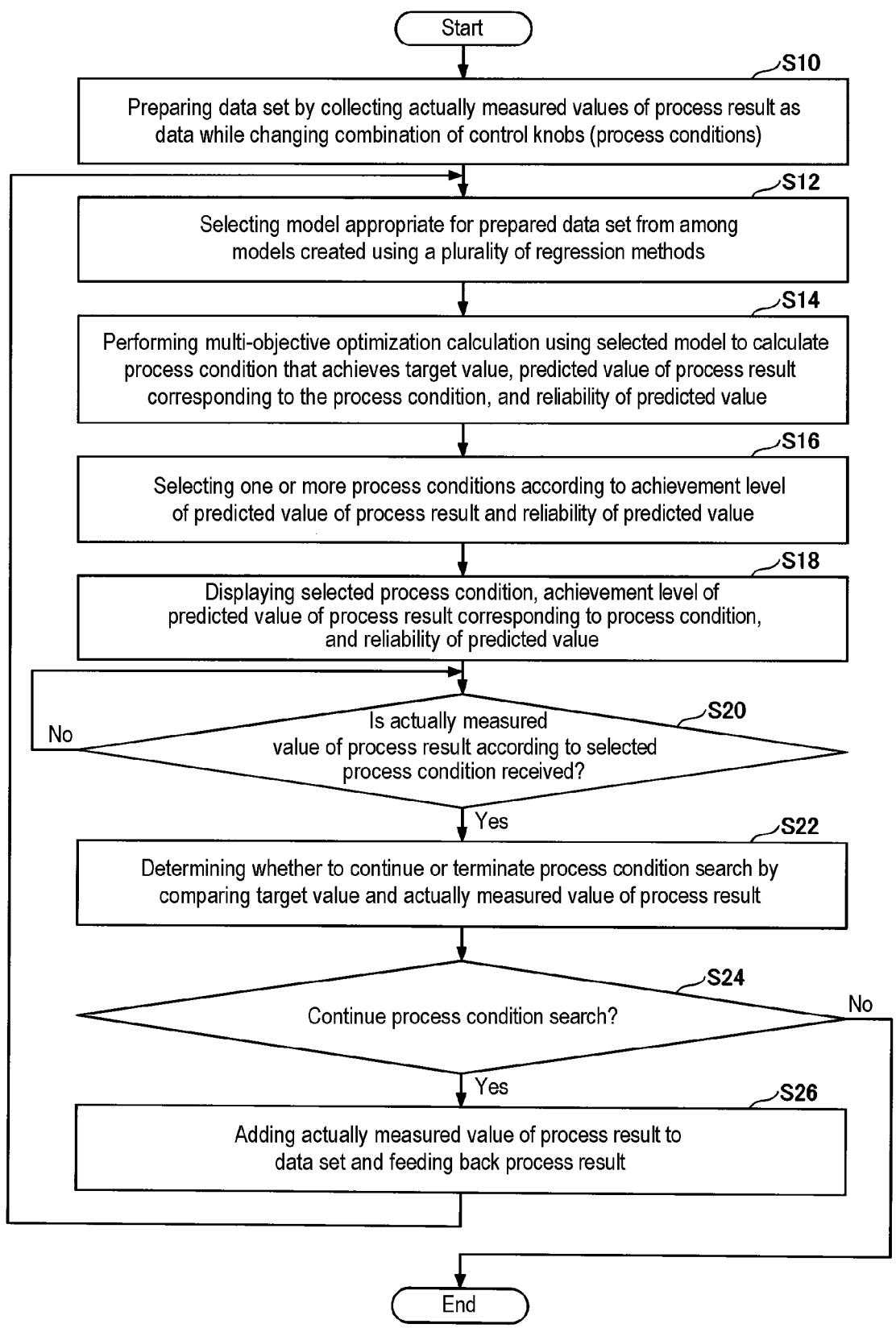
FIG. 4 is a flowchart of an example of a process performed by an information processing system according to an embodiment.

FIG. 4 is a flowchart of an example of a process performed by an information processing system according to the present embodiment. The information processing system 1 according to the present embodiment requires a prepared data set to be used for machine learning. In step S10, for example, the operator causes the semiconductor manufacturing device 10 to execute a film formation process while changing process conditions, and collects as data actually measured values of a film forming result when the film formation process is executed according to each process condition, thereby preparing the data set. In addition, the data set does not have to be prepared manually by the operator. For example, the data set may be prepared by automatically performing a design of experiment. The prepared data set is stored in the data set storage part 66.

Figure 5:
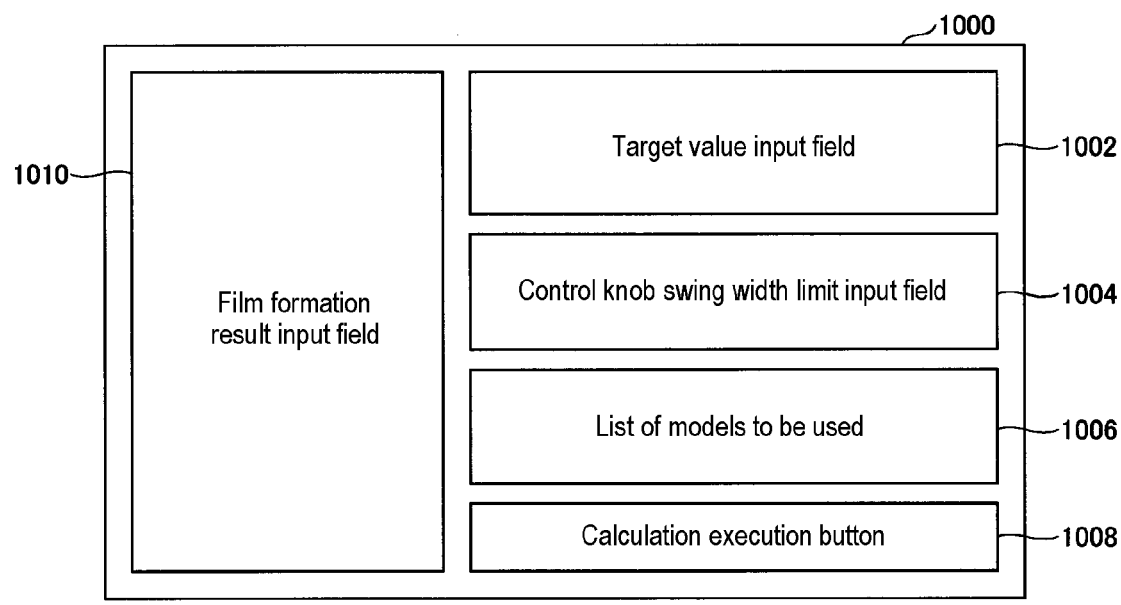
FIG. 5 is an image diagram of an example of an input screen.

The operator who starts searching for a process condition that can achieve the target film formation result may set necessary information on an input screen 1000 as illustrated in FIG. 5, and may start the process condition search by performing an operation of pushing a calculation execution button 1008.

FIG. 5 is an image diagram of an example of an input screen. The input screen 1000 of FIG. 5 includes a target value input field 1002, a control knob swing width limit input field 1004, a display field 1006 for displaying a list of models to be used, a calculation execution button 1008, and a film formation result input field 1010.

The target value input field 1002 is a field for setting indicators (target values) for determining success or failure of a target film formation result. The target values of the film formation result include a plurality of indicators such as a film thickness, in-plane uniformity, a refractive index, a wet etching rate (WER), and the like. In addition, the target value input field 1002 may be configured to set a priority for each target value.

The control knob swing width limit input field 1004 is a field for setting upper and lower limits of parameters for adjusting the control knobs (a temperature, a pressure, a gas, and the like). The upper and lower limits of parameters are set for each control knob. Further, the control knob swing width limit input field 1004 may be configured to set a use priority for each control knob. For example, when $N_2$ gas is used, upper and lower limits of a flow rate of $N_2$ gas are set.

The display field 1006 for displaying a list of models to be used displays one or more machine learning models appropriate for the prepared data set as a list of machine learning models to be used. The display field 1006 may be configured to receive, from the operator, a change in the list of machine learning models to be used.

The calculation execution button 1008 is an example of a start instruction receiving part configured to receive an instruction for starting the process condition search from the operator. The analysis server 26, which has received the operation of pushing the calculation execution button 1008 from the operator, starts multi-objective optimization calculation by using machine learning models displayed as, for example, models to be used in the display field 1006.

The film formation result input field 1010 is a field for inputting actually measured values of the film formation result measured by the external measuring instrument 24 after causing the semiconductor manufacturing device 10 to execute the film formation process according to each of the one or more process conditions selected by the process condition selection part 56.

Returning back to step S12 of FIG. 4, the machine learning model creation part 50 of the analysis server 26 creates a plurality of machine learning models of regression methods such as linear regression and non-linear regression by using the data for learning in the data set stored in the data set storage part 66. In addition, the machine learning model selection part 52 selects, among the machine learning models created by the machine learning model creation part 50, one or more machine learning models appropriate for the prepared data set by using the data for evaluation in the data set stored in the data set storage part 66.

In step S14, the calculation part 54 acquires, for example, target values of the film formation result set in the target value input field 1002. In addition, the calculation part 54 performs multi-objective optimization calculation by using the one or more machine learning models selected by the machine learning model selection part 52 to calculate process conditions for achieving the target values of the film formation result, predicted values of the film formation result corresponding to each process condition, and reliability of the predicted values for each process condition.

In step S16, the process condition selection part 56 selects one or more process conditions from the process conditions calculated by the calculation part 54. The process condition selection part 56 refers to the predicted values of the process result of each process condition calculated by the calculation part 54 and the reliability of the predicted values, and selects one or more process conditions having good predicted process performance and high reliability. The process condition selection part 56 may receive an operation of selecting process conditions from the operator.

Figure 6:
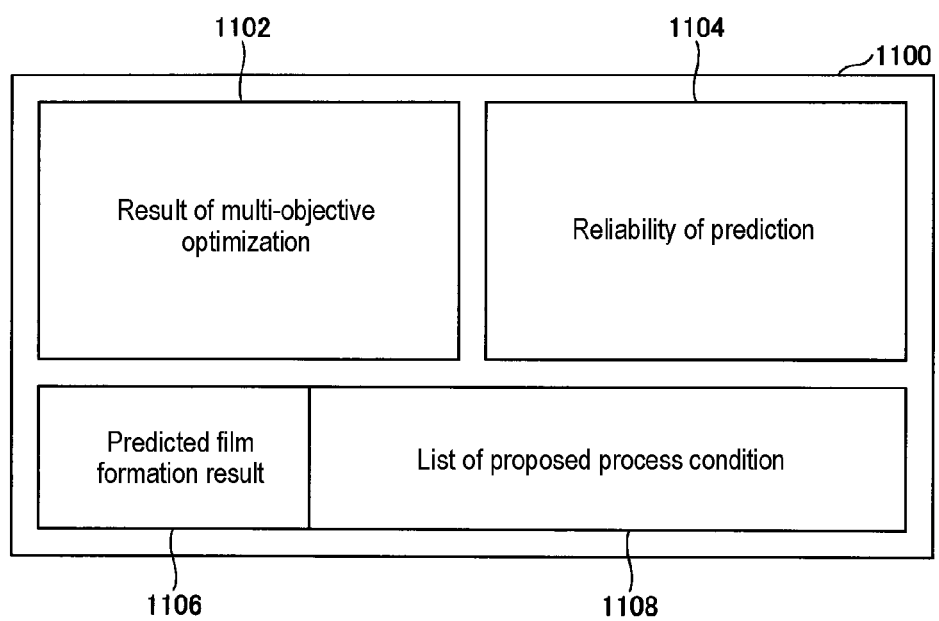
FIG. 6 is an image diagram of an example of an output screen.

In step S18, the display controller 58 displays, for example, on an output screen 1100 illustrated in FIG. 6 or the like, the one or more process conditions selected by the process condition selection part 56, achievement levels of the predicted values with respect to the target values of the film formation result corresponding to each condition, and the reliability of the predicted values.

FIG. 6 is an image diagram of an example of an output screen. The output screen 1100 of FIG. 6 includes a multi-objective optimization result display field 1102, a prediction reliability display field 1104, a predicted film formation result display field 1106, and a proposed process condition list display field 1108.

The multi-objective optimization result display field 1102 displays a result of multi-objective optimization calculation performed by the calculation part 54 by using one or more machine learning models. For example, in the multi-objective optimization result display field 1102, a result of multi-objective optimization calculation is displayed in a graph as shown in FIG. 7.

Figure 7:
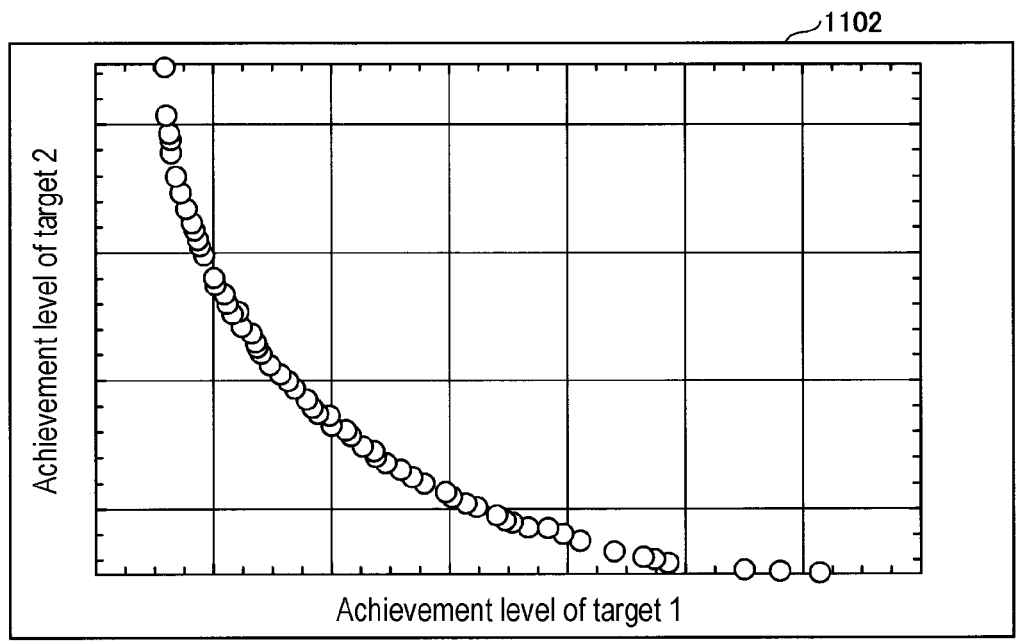
FIG. 7 is a display example of an example of a result of multi-objective optimization calculation.

FIG. 7 is a display example of a result of multi-objective optimization calculation. The multi-objective optimization result display field 1102 in FIG. 7 is an example in which process conditions as a result of multi-objective optimization calculation are indicated by a graph, where a horizontal axis represents an achievement level of a predicted value with respect to a first target value of a film formation result, and a vertical axis represents an achievement level of a predicted value with respect to a second target value of the film formation result. In the graph of FIG. 7, each plot represents a corresponding one of the process conditions that are the result of multi-objective optimization calculation.

The prediction reliability display field 1104 displays reliability of prediction based on the result of multi-objective optimization calculation performed using one or more machine learning models. For example, in the prediction reliability display field 1104, the reliability of prediction is displayed in a graph as illustrated in FIG. 8.

Figure 8:
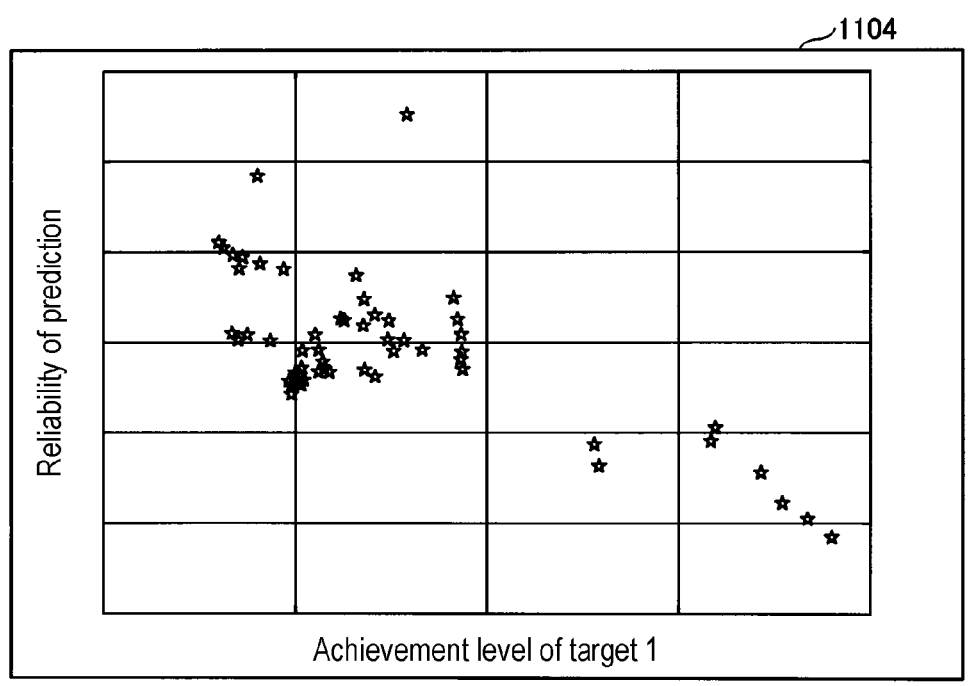
FIG. 8 is a display example of an example of prediction reliability.

FIG. 8 is a display example of an example of reliability of prediction. The prediction reliability display field 1104 of the in FIG. 8 is an example in which an achievement level of a predicted value with respect to a target value for each process condition and reliability of the predicted value are indicated by a graph, where a horizontal axis represents an achievement level of a predicted value with respect to the first target value of the film formation result, and a vertical axis represents reliability of the predicted value. In the graph of FIG. 8, each plot represents a corresponding one of the process conditions that are the result of multi-objective optimization calculation.

The proposed process condition list display field 1108 displays a list of process conditions, which are selected from the process conditions that are the result of multi-objective optimization calculation, and under which execution of the film formation process in the semiconductor manufacturing device 10 is proposed. In addition, the proposed process condition list display field 1108 may also be configured to receive a change in the list of process conditions for executing the film formation process in the semiconductor manufacturing device 10 from the operator. The predicted film formation result display field 1106 displays predicted values of a film formation result for each process condition proposed in the proposed process condition list display field 1108.

In addition, the first target value and the second target value displayed in the multi-objective optimization result display field 1102 and the prediction reliability display field 1104 of the output screen 1100 of FIG. 6 are examples, and it is desirable that the operator can select the first target value and the second target value. The operator determines one or more process conditions of the film formation process executed in the semiconductor manufacturing device 10 with reference to the output screen 1100 of FIG. 6.

The operator causes the semiconductor manufacturing device 10 to execute the film formation process under the one or more determined process conditions. When the film formation process is terminated, the operator measures actually measured values of a film forming result according to each process condition by using the external measuring instrument 24. The operator inputs the actually measured values of the film formation result measured by the external measuring instrument 24 to, for example, the film formation result input field 1010 of FIG. 5, thereby providing the actually measured values to the analysis server 26. The process result receiving part 60 receives the actually measured values of the film formation result corresponding to each of the one or more process conditions.

When the process result receiving part 60 receives the actually measured values of the film formation result corresponding to each of the one or more process conditions, the determination part 62 of the analysis server 26 proceeds the process from step S20 to step S22.

In step S22, the determination part 62 determines whether to continue or terminate the process condition search based on achievement levels of the actually measured values with respect to target values of the film formation result, by comparing the target values of the film formation result and the actually measured values of the film formation result according to each process condition under which the film formation process is executed in the semiconductor manufacturing device 10.

When the determination part 62 determines to continue the process condition search, the process proceeds from step S24 to step S26. The feedback part 64 feed backs a process result by adding a process condition, under which the film formation process has been executed by the semiconductor manufacturing device 10, and actually measured values of the process result corresponding to the process condition to the data set stored in the data set storage part 66. The analysis server 26 returns the process from step S26 to step S12. When the determination part 62 determines to terminate the process condition search, the analysis server 26 terminates the process in the flowchart of FIG. 4.

In the above, an example in which process conditions are selected based on the predicted values of the film formation result of each process condition calculated by the calculation part 54 and the reliability of the predicted values in step S16 has been described, but the present disclosure is not limited to this example. In step S16, the process conditions may be selected according to priorities of target values of a film formation result, use priorities of control knobs, a degree of similarity of process conditions calculated by machine learning models, and the like.

In step S16, the process condition selection part 56 selects one or more process conditions from the process conditions calculated by the calculation part 54 by performing multi-objective optimization calculation, for example, as follows.

For example, in step S16, it is assumed that a process condition having the largest sum Ji of the following two objective functions fj(xi) is selected. The process condition calculated by performing the multi-objective optimization calculation is xi. The objective function is fj(xi). In the following example, when J1>J2>J3 and the number of process conditions to be proposed is one, the process condition selection part 56 proposes the process condition x1 to the operator.

$$J1 = f1(x1) + f2(x1)$$
$$J2 = f1(x2) + f2(x2)$$
$$J3 = f1(x3) + f2(x3)$$

Further, as described above, when priorities of target values of a film formation result are set or use priorities of control knobs are set, weight factors according to the priorities may be assigned to the above formula.

In addition, in step S12, the plurality of regression methods may be separately used for each objective. For example, the regression methods may be used such that the machine learning models are separately used according to linearity or non-linearity of each control knob. A linear regression model is adopted for a process condition of a control knob that can be fully represented by a linear model. In contrast, a non-linear model is adopted for a process condition of a control knob that has strong non-linearity. The selection of a machine learning model is performed by the machine learning model selection part 52, but it may be performed through, for example, an operation by the operator.

In step S12, switching from a non-linear model to a locally linear regression model may be performed. In a region in which data has been sufficiently increased, it is possible to perform optimization using a more accurate machine learning model by performing switching from a nonlinear model to a locally linear regression model.

In the present embodiment, an example in which a film formation result includes a plurality of target values and a process condition includes a plurality of parameters for adjusting a plurality of control knobs has been described. However, the present disclosure is also applicable even when a film formation result includes a single target value, and a processing condition includes a single parameter for adjusting a single control knob.

According to the present embodiment, it is possible to solve a problem in that it takes time to search for a process condition for achieving a customer-specific target value of a process result because there are various target values for determining success of failure of a process result, and customers of the semiconductor manufacturing device 10 have target values of a process result different from one another.

Although embodiments of the disclosure have been described in detail above, the present disclosure is not limited to the above-described embodiments, and various modifications and substitutions can be made to the above-described embodiments without departing from the scope of the present disclosure. For example, in the present embodiment, a heat treatment device for film formation has been described as an example, but the present disclosure is also applicable to a batch film forming apparatus for a chemical vapor deposition (CVD) method, a thermal oxidation method, an ALD (atomic layer deposition) method, or the like.

According to the present disclosure, it is possible to search for process conditions that can achieve a target process result by using machine learning models of a semiconductor manufacturing device.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A system comprising:
an analysis server, which creates a machine learning model of a semiconductor manufacturing device executing a process according to a process condition and searches for a process condition that can achieve a target process result by using the machine learning model, the analysis server comprising:
 a machine learning model selector configured to select a machine learning model among a plurality of machine learning models created by using a plurality of regression methods;
 a calculator configured to perform an optimization calculation by using the selected machine learning model to calculate a plurality of process conditions that can achieve the target process result, predicted values of a process result corresponding to each of the plurality of process conditions, and reliability of the predicted values;
 a process condition selector configured to select, among the plurality of the process conditions that can achieve the target process result, one or more process conditions according to the predicted values of the process result and the reliability of the predicted values; and
 a display controller configured to display the selected process conditions, the predicted values of the process result corresponding to each of the selected process conditions, and the reliability of the predicted values,
 wherein the process condition selector is further configured to select the one or more process conditions among the plurality of process conditions that can achieve the target process result, based on priorities assigned to a plurality of target values included in the target process result, priorities assigned to a plurality of adjustment targets, which is included in the process conditions and to be adjusted in order to achieve the target process result, and achievement levels of the predicted values with respect to the target values of the process result; and
a device controller configured to:
 control the semiconductor manufacturing device to execute the process according to each of the selected process conditions.

2. The system of claim 1, the analysis server further comprising a determination part configured to determine whether to continue or terminate a process condition search based on a comparison result between actually measured values of a process result obtained by executing the process by the semiconductor manufacturing device according to each of the selected process conditions and target values of the process result.

3. The system of claim 2, the analysis server further comprising a feedback part configured to feed back the selected process conditions and the actually measured values of the process result obtained by executing the process by the semiconductor manufacturing device according to each of the selected process conditions to the machine learning model selector.

4. The system of claim 1, wherein the display controller is further configured to display an input field for inputting the priorities assigned to the target values, an input field for inputting the priorities assigned to the plurality of adjustment targets, and the machine learning model to be used, and to display a screen for receiving a change in the machine learning model to be used.

5. The system of claim 1, the analysis server further comprising a feedback part configured to feed back the selected process conditions and actually measured values of the process result obtained by executing the process by the semiconductor manufacturing device according to each of the selected process conditions to the machine learning model selector.

6. At least one non-transitory computer-readable storage medium storing a first program that causes an analysis server, which creates a machine learning model of a semiconductor manufacturing device executing a process according to a process condition and searches for a process condition that can achieve a target process result by using the machine learning model, to execute:
selecting a machine learning model among a plurality of machine learning models created by using a plurality of regression methods;
performing an optimization calculation by using the selected machine learning model to calculate a plurality of process conditions that can achieve the target process result, predicted values of a process result corresponding to each of the plurality of process conditions, and reliability of the predicted values;
selecting, among the plurality of the process conditions that can achieve the target process result, one or more process conditions according to the predicted values of the process result and the reliability of the predicted values; and
displaying the selected process conditions, the predicted values of the process result corresponding to each of the selected process conditions, and the reliability of the predicted values,
wherein the selecting the one or more process conditions includes selecting the one or more process conditions among the plurality of process conditions that can achieve the target process result, based on priorities assigned to a plurality of target values included in the target process result, priorities assigned to a plurality of adjustment targets, which is included in the process conditions and to be adjusted in order to achieve the target process result, and achievement levels of the predicted values with respect to the target values of the process result, and a second program that causes a device controller to execute:

controlling the semiconductor manufacturing device to execute the process according to each of the selected process conditions.

7. A process condition search method for an analysis server, which creates a machine learning model of a semiconductor manufacturing device executing a process according to a process condition and searches for a process condition that can achieve a target process result by using the machine learning model, the process condition search method comprising:

selecting a machine learning model among a plurality of machine learning models created by using a plurality of regression methods;

performing an optimization calculation by using the selected machine learning model to calculate a plurality of process conditions that can achieve the target process result, predicted values of a process result corresponding to each of the plurality of process conditions, and reliability of the predicted values;

selecting, among the plurality of the process conditions that can achieve the target process result, one or more process conditions according to the predicted values of the process result and the reliability of the predicted values;

displaying the selected process conditions, the predicted values of the process result corresponding to each of the selected process conditions, and the reliability of the predicted values, wherein the selecting the one or more process conditions includes selecting the one or more process conditions among the plurality of process conditions that can achieve the target process result, based on priorities assigned to a plurality of target values included in the target process result, priorities assigned to a plurality of adjustment targets, which is included in the process conditions and to be adjusted in order to achieve the target process result, and achievement levels of the predicted values with respect to the target values of the process result; and, causing the semiconductor manufacturing device to execute the process according to the selected process conditions.

* * * * *